(12) United States Patent
Hiraguchi (10) Patent No.: US 6,854,679 B2
(45) Date of Patent: Feb. 15, 2005

(54) RECORDING MEDIUM CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 51 days.

(21) Appl. No.: 10/347,783

(22) Filed: Jan. 22, 2003

(65) Prior Publication Data

US 2003/0136869 A1 Jul. 24, 2003

(30) Foreign Application Priority Data

Jan. 22, 2002 (JP) ........................................ 2002-013104

(51) Int. Cl.[7] .............................................. G11B 23/107
(52) U.S. Cl. ...................................... 242/348; 360/132
(58) Field of Search ................................ 242/347, 348, 242/348.2; 360/132, 133

(56) References Cited

U.S. PATENT DOCUMENTS 4,984,108 A    1/1991   Grant et al.

Primary Examiner—John Q. Nguyen
(74) Attorney, Agent, or Firm—Sughrue Mion, PLLC (57) ABSTRACT

A step portion is provided in a bottom surface of a concave portion of an upper case of the magnetic tape cartridge, at a rear end side in a loading direction of the magnetic tape cartridge. By providing the step portion at the concave portion of the upper case in this way, it is possible to increase a surface area of planar-contact between a side wall of the concave portion and a planarly-contacting portion of a claw portion of an upper hand portion forming a robot hand. Thus, when the magnetic tape cartridge is to be nipped, it is easy for the claw portion to catch thereon. Even if a top surface of the upper case swells slightly due to a spring provided within a case, the claw portion can reliably catch on the side wall of the concave portion.

7 Claims, 7 Drawing Sheets

RECORDING MEDIUM CARTRIDGE

BACKGROUND OF THE INVENTION

1. Field of the Invention

The present invention relates to a recording medium cartridge, particularly, to a recording medium cartridge in which a concave portion, to which a label can be affixed, is formed in the top surface of a case which rotatably accommodates a reel on which is wound a recording tape such as a magnetic tape or the like.

2. Description of the Related Art

Recording medium such as magnetic tapes and the like are used as recording media for storage of data (information) of computers and the like, and for audio and video. A recording tape cartridge, in which a recording tape is wound on a reel and which rotatably accommodates the reel in a case formed by resin molding, is used in order to prevent the recording surface of the recording tape from being damaged due to the recording surface being contacted or due to dirt or the like adhering thereto.

A so-called single reel cartridge (mainly used for back-up of information of computers or the like), in which a single reel on which a recording tape is wound is accommodated in a case, and a two-reel cartridge (e.g., audio cassettes, video cassettes), in which two reels (one for winding out and one for taking-up) are provided, are known as recording tape cartridges. Both types are loaded into a drive device (a recording/playback device) at the time when information is to be recorded or played back.

Usually, a large number of these recording tape cartridges are accommodated in an accommodating rack called a library which is equipped with a plurality of holders which can accommodate recording tape cartridges. A desired recording tape cartridge is removed by a robot hand or the like, and is loaded into one of a plurality of drive devices. The combination of the recording tape cartridge which the robot hand removes and the drive device into which that recording tape cartridge is loaded is, to a certain extent, random, so that a recording tape cartridge can be loaded into a drive device which is suitably free.

In the state in which the case of the recording tape cartridge, which is loaded in the drive device, is positioned within the drive device, the recording tape is pulled-out from the case. A recording/playback head of the drive device approaches the recording tape while the recording tape is guided along a predetermined tape path. In this way, recording of information onto the recording tape or playback of information recorded on the recording tape is carried out.

On the other hand, the robot hand is movable along rails, and moves in accordance with the position of the holder in which the desired recording tape cartridge is accommodated, or in accordance with the position of the drive device.

Figure 7:
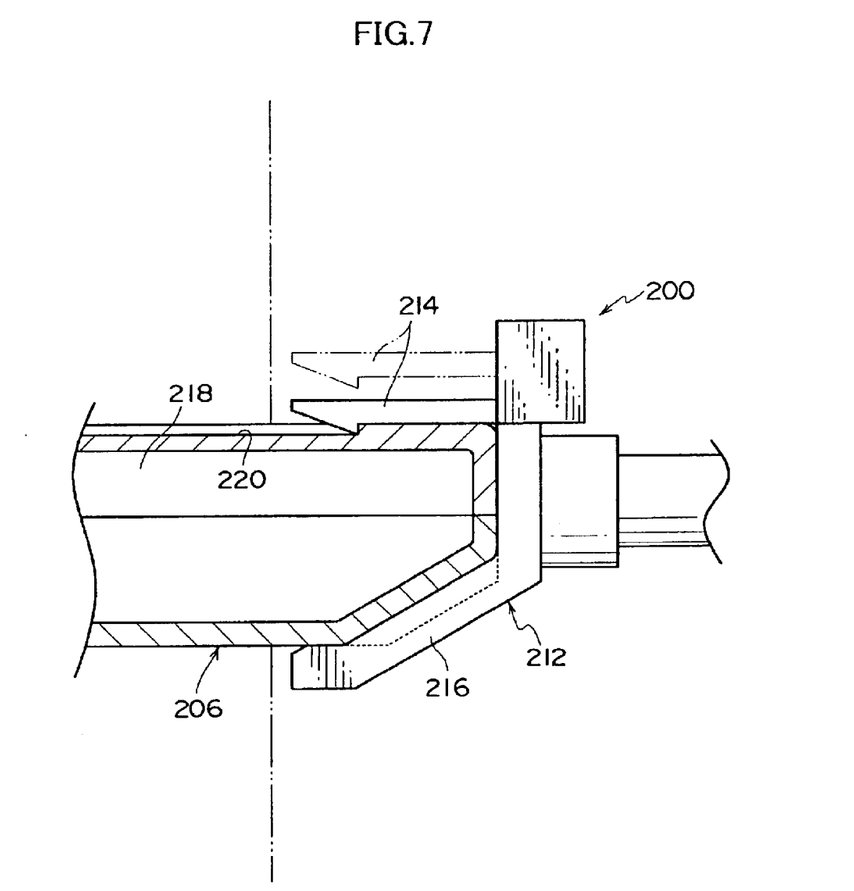
FIG. 7 is a side sectional view showing a state in which a conventional magnetic tape cartridge is nipped by a robot hand.

As shown in FIG. 7, a nipping body 212, which nips a recording tape cartridge 206, is provided at a robot hand 200. An upper hand portion 214 and a lower hand portion 216 are provided at the nipping body 212, and the upper hand portion 214 is disposed above the lower hand portion 216.

Here, a concave portion 220, to which a label can be affixed, is formed in a recessed manner in the top surface of a case 218 of the recording tape cartridge 206. In a state in which the upper hand portion 214, which is shaped as a claw, catches on the concave portion 220 and the bottom surface of the case 218 is held by the lower hand portion 216, the recording tape cartridge 206 is nipped and is moved from a holder (not illustrated) to a drive device (not illustrated), or from a drive device to a holder.

However, an unillustrated spring is disposed in the central portion within the case 218 of the recording tape cartridge 206. The spring downwardly urges a reel (not shown) accommodated within the case 218. Due to the pushing force of the spring, a slight amount of swelling arises at the top surface of the case 218. Therefore, when the recording tape cartridge 206 is nipped, there are cases in which the upper hand portion 214 cannot catch on the concave portion 220 well.

SUMMARY OF THE INVENTION

In view of the aforementioned, an object of the present invention is to provide a recording medium cartridge which can reliably be nipped by a robot hand.

A first aspect of the invention is a recording medium cartridge in which a concave portion, to which a label can be affixed, is formed in a top surface of a case, wherein at least one step portion is formed in a recessed manner at a rear end side, in a loading direction of the case, of the concave portion.

In a second aspect of the invention according to the first aspect, the recording medium cartridge rotatably accommodates a reel on which a recording tape is wound.

In a third aspect of the invention according to the first aspect, the step portion extends in a direction orthogonal to the loading direction of the case.

In a fourth aspect of the invention according to the first aspect, a built-up portion is provided at a back side of the case of the step portion.

In a fifth aspect of the invention according to the fourth aspect, a thickness of the built-up portion is determined such that a thickness of the step portion is substantially the same as a thickness of a portion, which is in the vicinity of the step portion, of the concave portion.

In a sixth aspect of the invention according to the first aspect, a corner portion of the step portion is chamfered.

A seventh aspect of the invention is a recording medium cartridge in which a concave portion, to which a label can be affixed, is formed in a top surface of a case which rotatably accommodates a reel on which a recording tape is wound, wherein a step portion, which extends in a direction orthogonal to a loading direction of the case, is formed in a recessed manner at a rear end side, in the loading direction of the case, of the concave portion.

A robot hand catches on a side wall of the concave portion and nips the recording tape cartridge, and moves the case between a library and a drive device at which information can be recorded onto or played back from the recording tape. The step portion, which extends along the direction orthogonal to the loading direction of the case, is provided at the bottom surface of the concave portion. In this way, the side wall of the concave portion can be made deeper, and the surface area of abutment with the robot hand can be increased.

Thus, when the robot hand nips the recording tape cartridge, it is easy for the robot hand to catch thereon. Even if the top surface of the case swells slightly due to a spring provided within the case, the robot hand can reliably catch on and nip the case.

In other words, the step portion is provided at the bottom surface of the concave portion, and the surface area of abutment with the robot hand is increased. In this way, the depth of the concave portion itself can be made to be more shallow, and the rigidity of the case can be increased. Thus, deformation of the case due to the pressing force of the spring can be suppressed, and the robot hand can reliably catch on and nip the case.

DESCRIPTION OF THE PREFERRED EMBODIMENT

A summary of the recording tape cartridge (hereinafter, "magnetic tape cartridge") relating to an embodiment of the present invention will be given hereinafter. Note that, for convenience of explanation, the direction of loading the magnetic tape cartridge into the drive device (the direction of arrow A) is called the front direction, the direction of arrow B is called the bottom direction, and the front, rear, left, right, top, and bottom are expressed with a case of looking in the direction of arrow A being used as the reference.

Figure 1:
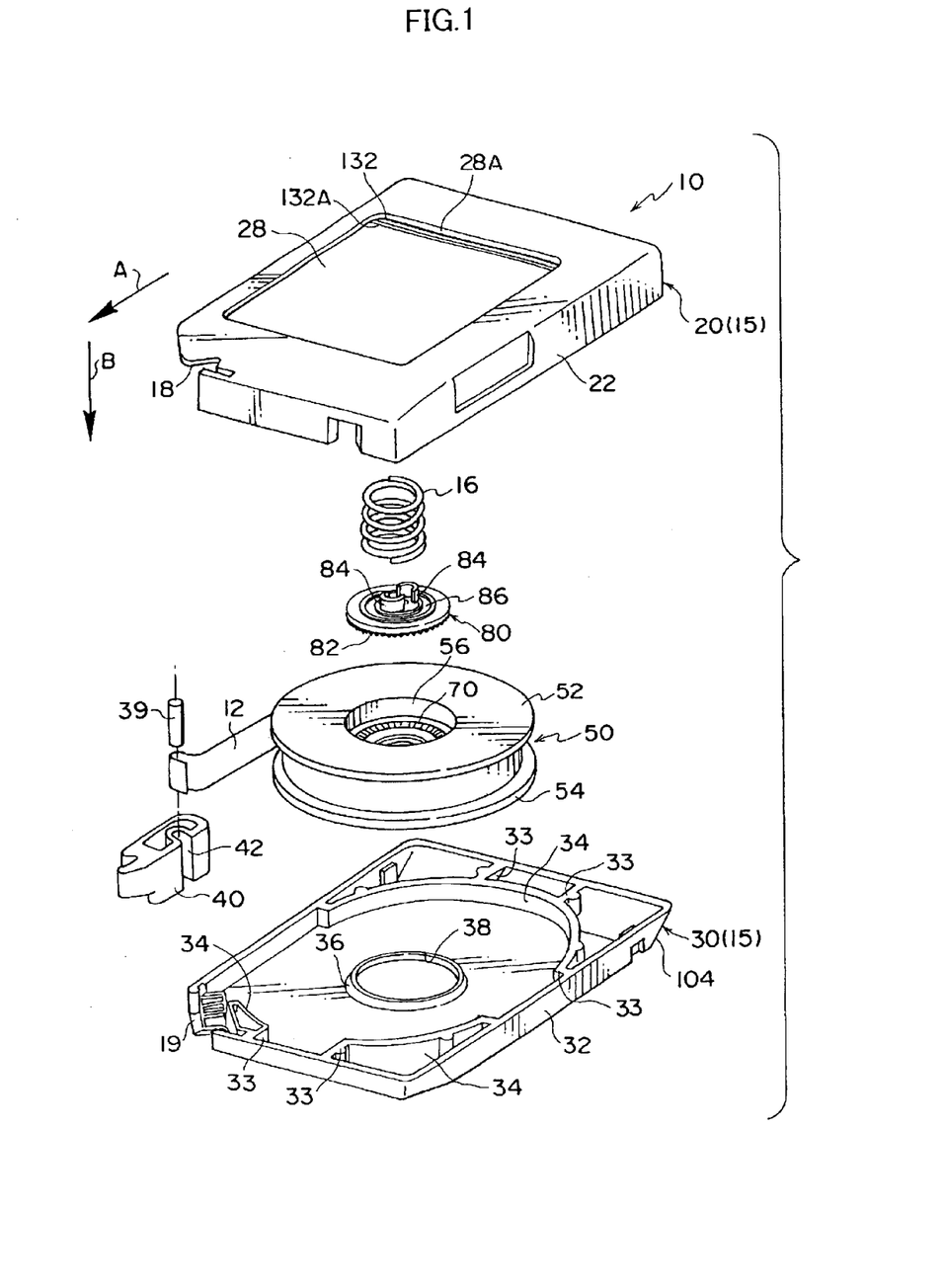
FIG. 1 is an exploded perspective view illustrating the overall structure of a magnetic tape cartridge relating to an embodiment of the present invention.
Figure 2:
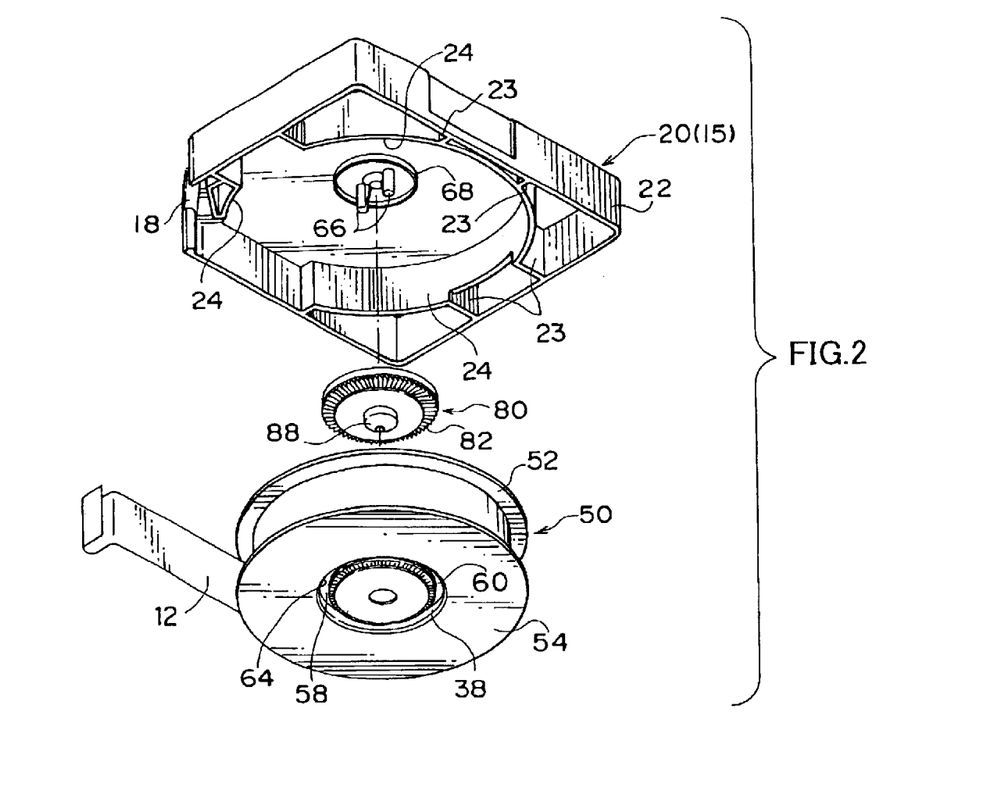
FIG. 2 is a perspective view, as seen from below, of an upper case and a reel forming the magnetic tape cartridge relating to the embodiment of the present invention.

As shown in FIG. 1 and FIG. 2, a magnetic tape cartridge 10 has a case 15 formed in a substantially rectangular box shape. The case 15 is formed by an upper case 20 and a lower case 30 formed of a synthetic resin. The case 15 is formed by a peripheral wall 22 of the upper case 20 and a peripheral wall 32 of the lower case 30 being welded together by ultrasonic welding or the like. A concave portion 28, which is substantially rectangular as seen in plan view, is formed in a recessed manner in the top surface of the upper case 20. A label can be affixed to the concave portion 28.

Arc-shaped walls 24, 34 stand erect at the inner surfaces of the upper case 20 and the lower case 30, respectively. The inner diameters of the arc-shaped walls 24, 34 are slightly larger than the outer diameters of an upper flange 52 and a lower flange 54 of a reel 50. The reel 50 is rotatably accommodated at the inner sides of the arc-shaped walls 24, 34.

A plurality of ribs 23 are formed between the arc-shaped wall 24 and the peripheral wall 22. A plurality of ribs 33 are formed between the arc-shaped wall 34 and the peripheral wall 32. The arc-shaped walls 24, 34 and the peripheral walls 22, 32 are connected together by the ribs 23, 33, respectively. Therefore, the ribs 23, 33 strengthen the arc-shaped walls 24, 34 and the peripheral walls 22, 32 and increase the rigidity of the upper case 20 and the lower case 30, respectively.

The reel 50 is formed by a cylindrical reel hub 56, and the upper flange 52 and the lower flange 54 which are provided at the end portions of the reel hub 56, respectively. The transverse direction end portions of a magnetic tape 12, which serves as an information recording/playback medium which is wound on the reel hub 56, are held at the upper flange 52 and the lower flange 54.

A bottom wall 58, in whose center a hole portion (not shown) is formed, is provided at the lower flange 54 of the reel hub 56. An annular reel gear 60 is formed at the bottom surface of the bottom wall 58 so as to project from the bottom wall 58.

The reel gear 60 can emerge from a round hole 38 provided at the center of the lower case 30. The reel gear 60 is positioned in a state of being accommodated within a bucket (not shown) provided at a drive device 100.

When the magnetic tape cartridge 10 is disposed at a predetermined position, a driving gear, which is provided at an unillustrated driving device disposed at the drive device 100 (see FIG. 3), meshes with the reel gear 60 shown in FIG. 2 such that torque is transmitted to the reel 50.

An annular groove 64 is formed at the outer side of the reel gear 60. The reel 50 is positioned with respect to the lower case 30 by a rib 36, which stands erect at the peripheral portion of the hole 38 formed in the lower case 30, being inserted into the annular groove 64.

As shown in FIGS. 1 and 2, an annular reel gear 70 is formed at the top surface of the bottom wall 58 of the reel hub 56. A braking gear 82, which is provided at the outer peripheral portion of the bottom surface of a substantially disc-shaped braking member 80 which can be accommodated within the reel gear 56, can mesh with the annular reel gear 70.

Ribs (hereinafter, "U-shaped ribs") 84, which are substantially U-shaped as seen in plan view, stand erect at the top surface of the braking member 80 such that the open sides thereof face one another. A pair of anchor pins 66 are suspended downward from the center of the inner surface of the upper case 20, and can engage with the U-shaped ribs 84.

In this way, the braking member 80 can move within the reel hub 56 and the U-shaped ribs 84 of the braking member 80 can move along the anchor pins 66, and rotation is impeded. Thus, when the magnetic tape cartridge 10 is not in use, the braking gear 82 of the braking member 80 and the reel gear 70 mesh together, and rotation of the reel 50 is prevented.

Further, an annular groove 86 is provided at the outer side of the U-shaped ribs 84 of the braking member 80. On the other hand, an annular projection 68 projects at the outer side of the anchor pins 66 of the upper case 20. A spring 16 is placed between the braking member 80 and the upper case 20. The spring 16 is held by the annular projection 68 and the annular groove 86.

In this way, the braking member 80 is urged toward the reel gear 70, and the braking gear 82 and the reel gear 70 can strongly mesh together. Thus, unintentional rotation of the reel 50 can reliably be prevented.

Here, a substantially cylindrical projection 88, which can be inserted through a hole portion formed in the bottom wall 58, projects at the center of the bottom surface of the braking member 80. The braking member 80 is pushed upward in a direction against the urging force of the spring 16 via the projection 88 by an unillustrated meshing releasing pin provided at the drive device 100 (see FIG. 3), and the meshing of the braking gear 82 and the reel gear 70 is cancelled. In this way, the reel 50 becomes able to rotate.

Opening portions 18, 19 are formed in the front right corner portions of the peripheral wall 22 of the upper case 20 and the peripheral wall 32 of the lower case 30, respectively. The opening portions 18, 19 are provided to allow the magnetic tape 12, which is wound on the reel 50, to be pulled out to the exterior.

The distal end portion of the magnetic tape 12 is trained on a pin 39. The pin 39 engages with a concave portion 42 formed in a leader block 40, such that the magnetic tape 12 is integral with the leader block 40.

An unillustrated pull-out pin provided at the drive device 100 engages with the leader block 40, and the magnetic tape 12 is taken-up by a take-up reel (not illustrated) provided at the drive device 100. At this time, while the reel 50 and the take-up reel are driven to rotate synchronously and the magnetic tape 12 is successively taken-up onto the take-up reel, information is recorded or played back.

On the other hand, when the magnetic tape cartridge 10 is not in use, the leader block 40 is anchored on the peripheral portions of the opening portions 18, 19, and the opening portions 18, 19 are closed by the leader block 40.

Figure 3:
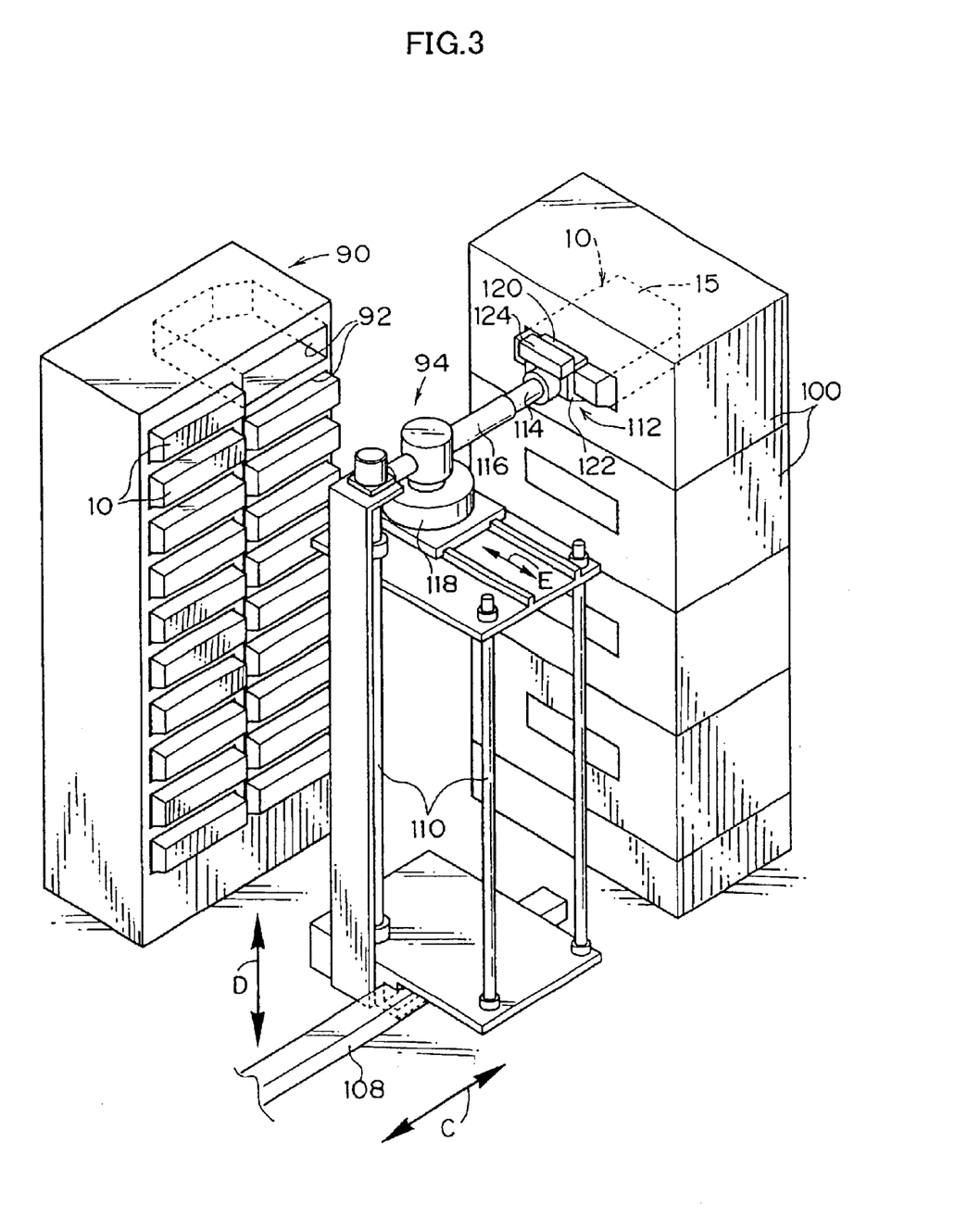
FIG. 3 is a perspective view showing a robot hand which moves the magnetic tape cartridge relating to the embodiment of the present invention between a library and a drive device.

Here, as shown in FIG. 3, usually, a large number of the magnetic tape cartridges 10 are accommodated in an accommodating rack called a library 90 which is equipped with a plurality of holders 92 which can accommodate the magnetic tape cartridges 10. The desired magnetic tape cartridge 10 is removed by a robot hand 94, and is loaded into one of a plurality of the drive devices 100. In a state in which the magnetic tape cartridge 10 is positioned within the drive device 100, the magnetic tape 12 (see FIG. 1) is pulled-out from the case 15. The magnetic tape 12 approaches a recording/playback head (not illustrated) of the drive device 100 while the magnetic tape 12 is guided along a predetermined tape path. In this way, recording of information onto the magnetic tape 12 or playback of information recorded on the magnetic tape 12 is carried out.

Here, the robot hand which moves the magnetic tape cartridge will be described.

Figure 4:
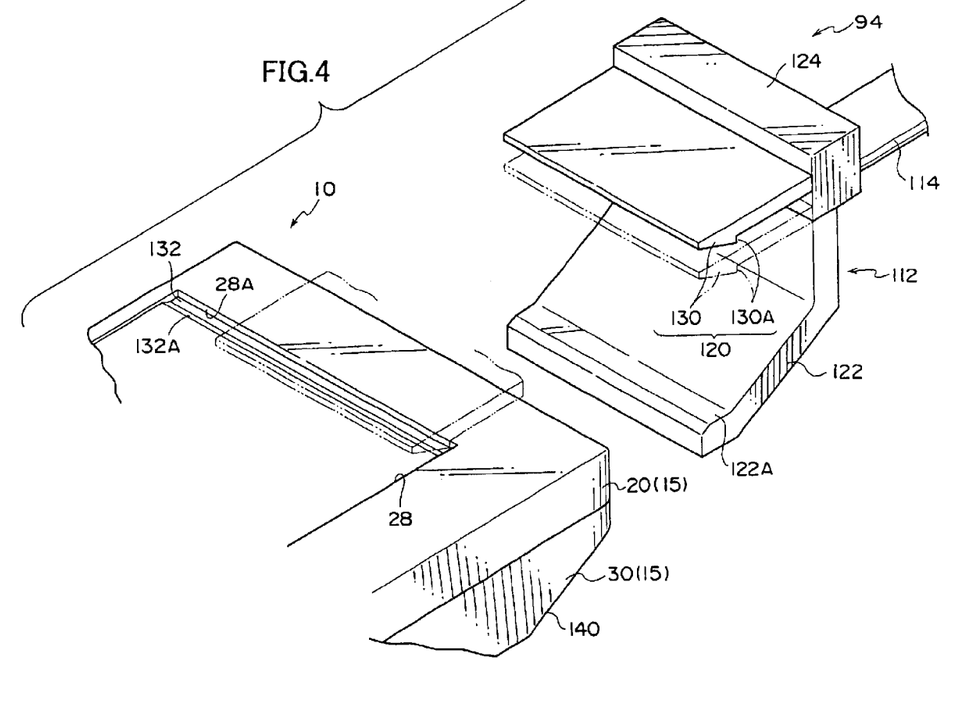
FIG. 4 is a perspective view showing the robot hand and the magnetic tape cartridge relating to the embodiment of the present invention.

As shown in FIGS. 3 and 4, the depth of the holder 92 of the library 90 is shorter than the front-back direction length of the magnetic tape cartridge 10. In the state in which the magnetic tape cartridge 10 is accommodated in the holder 92, the rear end of the magnetic tape cartridge 10 is exposed from the holder. The robot hand 94 nips this exposed portion, and moves the magnetic tape cartridge 10.

The robot hand 94 is movable in the directions of arrow C and in the directions of arrow D along rails 108, 110, and moves in accordance with the position of the magnetic tape cartridge 10 which is desired. Further, a nipping body 112, which nips the magnetic tape cartridge 10, is provided at the robot hand 94. A rod 114 projects from and withdraws into a cylinder 116 due to air. The nipping body 112 is thereby made to approach and move away from the holders 92 and the drive devices 100.

A turntable 118 is provided at the robot hand 94. The turntable 118 can move in the directions of arrow E. The turntable 118 rotates and can be moved quickly when the magnetic tape cartridge 10 is moved from the holder 92 of the library 90 to the drive device 100, or from the drive device 100 to the holder 92.

The nipping body 112 is formed by an upper hand portion 120 and a lower hand portion 122. The upper hand portion 120 is disposed above the lower hand portion 122. The lower hand portion 122 is inclined at a downward slant so as to be able to planarly-contact an inclined surface portion 104 formed at the lower case 30. A planarly-contacting portion 122A is formed horizontally at the distal end portion of the lower hand portion 122, and can planarly-contact the bottom surface of the lower case 30.

A driving device 124 is provided at the nipping body 112. The upper hand portion 120 can be moved up and down by an unillustrated stepping motor provided at the driving device 124.

A claw portion 130 is formed at the distal end portion of the upper hand portion 120. A side wall 28A of the concave portion 28 which is formed in a recessed manner in the upper case 20, can planarly-contact a planarly-contacting portion 130A of the claw portion 130.

In accordance with the above-described structure, when the robot hand 94 is positioned so as to correspond to the position of a desired magnetic tape cartridge 10, the rod 114 is extended, and the nipping body 112 is made to approach the magnetic tape cartridge 10.

At this time, the upper hand portion 120 of the nipping body 112 is positioned above, such that there is a gap between the upper hand portion 120 and the top surface of the upper case 20. Thus, only the lower hand portion 122 planarly-contacts the inclined surface portion 104 of the lower case 30 and the bottom surface of the lower case 30. The surface area of this contact gradually increases as the rod 114 is extended. Then, when the rod 114 stops, the stepping motor provided at the nipping body 112 is driven and the upper hand portion 120 is moved downward.

In this way, in the state in which the planarly-contacting portion 130A of the claw portion 130 of the upper hand portion 120 planarly-contacts the side surface 28A of the concave portion 28 of the upper case 20 and the upper hand portion 120 catches on the upper case 20, the upper hand portion 120 and the lower hand portion 122 are nipping the magnetic tape cartridge 10, and move the magnetic tape cartridge 10 in accordance with the position of the holder 92 and the drive device 100.

Here, the main portions of the magnetic tape cartridge relating to the embodiment of the present invention will be described.

Figure 5:
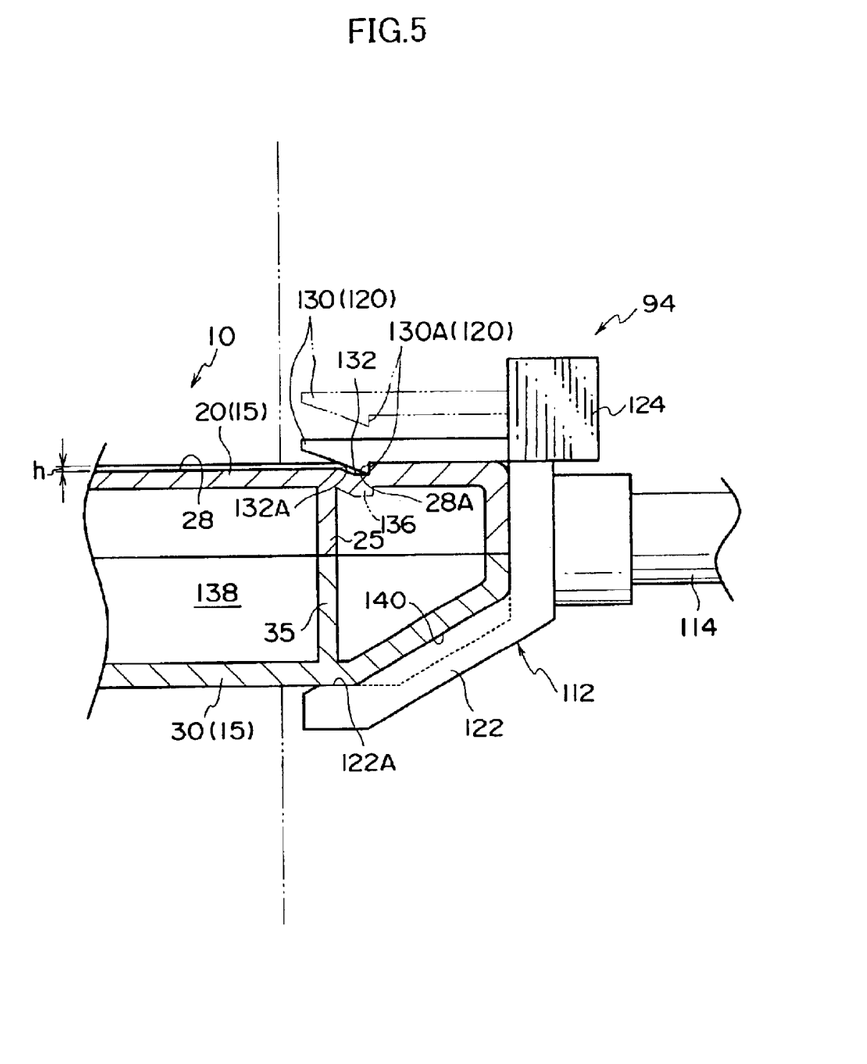
FIG. 5 is a side sectional view showing a state in which the magnetic tape cartridge relating to the embodiment of the present invention is nipped by the robot hand.

As shown in FIGS. 4 and 5, a step portion 132, which extends in a direction orthogonal to the loading direction of the magnetic tape cartridge 10, is provided in the bottom surface of the concave portion 28 of the upper case 20 of magnetic tape cartridge 10, at the rear end side in the direction of loading of the magnetic tape cartridge 10 (i.e., at the side abutted by the claw portion 130 of the upper hand portion 120 of the robot hand 94).

An inclined portion 132A is formed at the corner portion of the step portion 132. Namely, the corner portion is chamfered. Therefore, when the planarly-contacting portion 130A of the claw portion 130 planarly-contacts the side surface 28A of the concave portion 28, the claw portion 130 has more room to move and movement thereof is not restricted by the corner portion.

As described above, by providing the step portion 132 at the concave portion 28 of the upper case 20, it is possible to increase the surface area of planar contact between the side wall 28A of the concave portion 28 and the planarly-contacting portion 130A of the claw portion 130 of the upper hand portion 120 which forms the robot hand 94.

Thus, when the magnetic tape cartridge 10 is to be nipped, it is easy for the claw portion 130 to catch on the magnetic tape cartridge 10. Even if the top surface of the upper case 20 swells slightly due to the spring 16 provided within the case 15, the side wall 28A of the concave portion 28 can be reliably caught by the claw portion 130.

Figure 6:
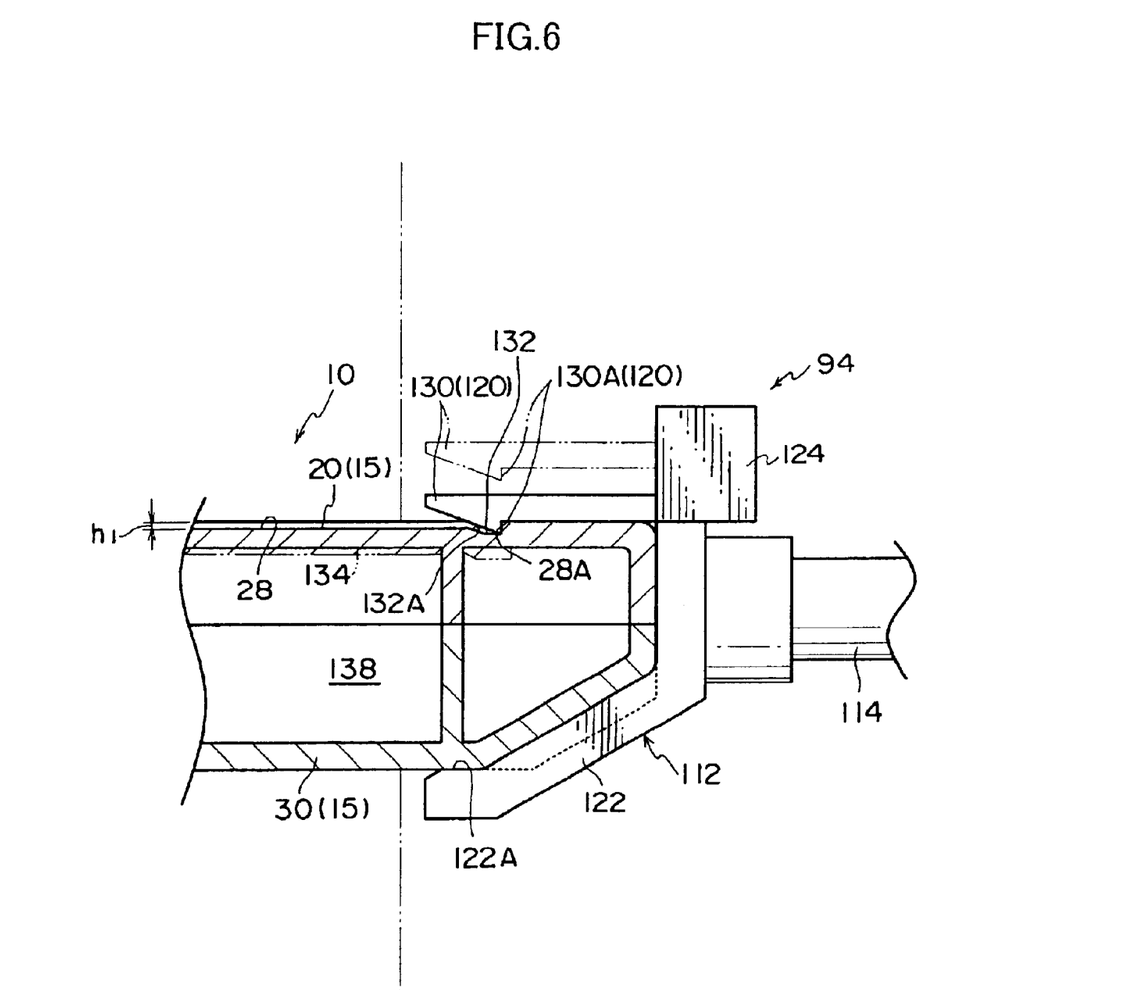
FIG. 6 is a side sectional view showing a state in which the magnetic tape cartridge relating to the embodiment of the present invention is nipped by the robot hand.

When the concave portion 28 is made to be thin-walled, the difference in the wall thicknesses of the concave portion 28 and the region surrounding the concave portion 28 becomes large. Therefore, shrink marks and the like may arise in the region surrounding the concave portion 28 due to fluctuations in pressure at the time of molding. Thus, as shown in FIG. 6, a built-up portion 134 (illustrated by the imaginary line), which has a thickness corresponding to a depth of the concave portion 28, is formed to project at the inner wall surface of the case 15 over the entire reverse surface of the concave portion 28. In this way, the difference in wall thicknesses between the concave portion 28 and the region surrounding the concave portion 28 does not arise, and shrink marks and the like are not generated at the region surrounding the concave portion 28.

However, the step portion 132 is provided at the concave portion 28 at the side which is abutted by the claw portion 130 of the upper hand portion 120. The surface area over which the claw portion 130 and the side wall 28A of the concave portion 28 planarly-contact one another is increased, and it is easier for the claw portion 130 to catch thereon. In this way, as shown in FIG. 5, the depth h ($<h_1$) of the concave portion 28 itself can be made to be more shallow.

In this way, when the depth h of the concave portion 28 itself is made to be shallow, the concave portion 28 can be made to be thicker. Therefore, it suffices to not provide the built-up portion 134 (see FIG. 6) over the entire reverse surface of the concave portion 28, and an internal space 138 of the case 15 can be enlarged.

By making the concave portion 28 thicker, the rigidity of the case 15 can be increased, and the deformation of the case 15 caused by the pressing force of the spring 16 (see FIG. 1) can be suppressed. However, the wall thickness becomes thin at the step portion 132. Thus, it is preferable to provide a built-up portion 136 (illustrated by the imaginary line) at the reverse surface side of the step portion 132 so as to strengthen the case 15 and make the difference in the wall thicknesses of the step portion 132 and the region at the periphery thereof small.

Further, arc-shaped reinforcing ribs 25, 35 are provided at the inner surface sides of the upper case 20 and the lower case 30 corresponding to the reverse surface side of the step portion 132, and are formed integrally with the arc-shaped walls 24, 34 (see FIGS. 1 and 2). In this way, the case 15 can be further strengthened.

Here, the step portion 132 is provided at the concave portion 28 of the upper case 20, and the corner portion of the step portion 132 is chamfered. However, it suffices that movement of the claw portion 130 is not limited by the corner portion at the time when the planarly-contacting portion 130A of the claw portion 130 of the upper hand portion 120 planarly-contacts the side wall 28A of the concave portion 28. Therefore, it is not absolutely necessary to chamfer the corner portion of the step portion 132. For example, a corner groove whose cross-section is substantially rectangular may be formed.

Further, as shown in FIG. 1, the leader block 40 is manipulated at the time when the magnetic tape 12 is pulled out from the case 15. However, the present invention is not limited to the same. It goes without saying that the present invention can be applied to recording tape cartridges provided with any manipulation member in place of the leader block 40. Accordingly, for example, a leader pin or a leader tape may be used.

In the present embodiment, an example is given in which the present invention is applied to the magnetic tape cartridge 10 which rotatably accommodates the single reel 50 within the case 15. However, the present invention is not limited to the same, and may be applied to, for example, a magnetic tape cartridge equipped with two reels such as for video or the like.

Moreover, although the magnetic tape 12 is used as the recording tape, the present invention is not limited to the same. It suffices for the recording tape to be interpreted as an elongated, tape-shaped information recording/playback medium on which information can be recorded and from which recorded information can be played back. The recording tape cartridge relating to the present invention can be applied to recording tapes for any recording/playback methods.

Moreover, the present invention can be applied to a recording medium cartridge in which a recording medium other than a recording tape is accommodated.

Moreover, in the present invention, a configuration of the step portion can be modified in accordance with a configuration of the claw portion 130 (the upper hand portion 120). Therefore, the step portion extends in the embodiment, however, the present invention is not limited to the same.

Because the present invention has the above-described structure, when the recording tape cartridge is grasped, it is easy for a robot hand to catch on the recording tape cartridge, and even if the top surface of the case slightly swells due to a spring provided within the case, the robot hand can reliably catch on and nip the case.

What is claimed is:

1. A recording medium cartridge in which a concave portion, to which a label can be affixed, is formed in a top surface of a case,
    wherein at least one step portion is formed in a recessed manner at a rear end side, in a loading direction of the case, of the concave portion.

2. A recording medium cartridge according to claim 1, wherein the recording medium cartridge rotatably accommodates a reel on which a recording tape is wound.

3. A recording medium cartridge according to claim 1, wherein the step portion extends in a direction orthogonal to the loading direction of the case.

4. A recording medium cartridge according to claim 1, wherein a built-up portion is provided at a back side of the case of the step portion.

5. A recording medium cartridge according to claim 4, wherein a thickness of the built-up portion is determined such that a thickness of the step portion is substantially the same as a thickness of a portion, which is in the vicinity of the step portion, of the concave portion.

6. A recording medium cartridge according to claim 1, wherein a corner portion of the step portion is chamfered.

7. A recording medium cartridge in which a concave portion, to which a label can be affixed, is formed in a top surface of a case which rotatably accommodates a reel on which a recording tape is wound,
    wherein a step portion, which extends in a direction orthogonal to a loading direction of the case, is formed in a recessed manner at a rear end side, in the loading direction of the case, of the concave portion.

* * * * *